United States Patent
Narikawa

(10) Patent No.: US 11,448,948 B2
(45) Date of Patent: Sep. 20, 2022

(54) PROCESSING METHOD OF IMAGE DATA, PROJECTION APPARATUS, PROCESSING APPARATUS OF IMAGE DATA

(71) Applicant: CASIO COMPUTER CO., LTD., Tokyo (JP)

(72) Inventor: Tetsuro Narikawa, Hamura (JP)

(73) Assignee: CASIO COMPUTER CO., LTD, Tokyo (JP)

( * ) Notice: Subject to any disclaimer, the term of this patent is extended or adjusted under 35 U.S.C. 154(b) by 2 days.

(21) Appl. No.: 17/199,132

(22) Filed: Mar. 11, 2021

(65) Prior Publication Data

US 2021/0286243 A1    Sep. 16, 2021

(30) Foreign Application Priority Data

Mar. 13, 2020  (JP) .............................. JP2020-043891

(51) Int. Cl.
  *G03B 21/16*  (2006.01)
  *H04N 9/31*  (2006.01)
  *G03B 21/20*  (2006.01)
  *G09G 5/10*  (2006.01)

(52) U.S. Cl.
  CPC ......... *G03B 21/16* (2013.01); *G03B 21/2053* (2013.01); *H04N 9/3155* (2013.01); *G09G 5/10* (2013.01); *G09G 2330/024* (2013.01); *G09G 2330/045* (2013.01)

(58) Field of Classification Search
  CPC ... G03B 21/16; G03B 21/2053; H04N 9/3155
  See application file for complete search history.

(56) References Cited

U.S. PATENT DOCUMENTS

| | | | | |
|---|---|---|---|---|
| 9,104,059 | B2* | 8/2015 | Shioya | G02F 1/133385 |
| 10,506,206 | B2* | 12/2019 | Orlick | G03B 21/16 |
| 11,114,062 | B2* | 9/2021 | Liang | G09G 3/002 |
| 11,323,669 | B2* | 5/2022 | Orlick | H04N 9/3144 |
| 2006/0127081 | A1* | 6/2006 | Lee | G09G 3/3611 |
| | | | | 396/282 |
| 2010/0265278 | A1* | 10/2010 | Nishioka | H01S 5/042 |
| | | | | 345/690 |
| 2013/0128457 | A1* | 5/2013 | Shioya | G02F 1/133385 |
| | | | | 361/695 |

(Continued)

FOREIGN PATENT DOCUMENTS

| | | |
|---|---|---|
| JP | 2002-268142 A | 9/2002 |
| JP | 2006-084884 A | 3/2006 |

(Continued)

*Primary Examiner* — Bao-Luan Q Le
(74) *Attorney, Agent, or Firm* — Fitch, Even, Tabin & Flannery LLP

(57) ABSTRACT

In a processing method of image data in accordance with an embodiment of the present invention, a processor of an information processing apparatus calculates a heat quantity value when projecting and displaying image data, determines the image data as an image to be projected and displayed when the heat quantity value does not reach a threshold value, and generates processed image data so that a heat quantity is to be lower than the heat quantity value and determines the processed image data as an image to be projected and displayed when the heat quantity value exceeds the threshold value.

19 Claims, 6 Drawing Sheets

(56) References Cited

U.S. PATENT DOCUMENTS

| | | | |
|---|---|---|---|
| 2018/0146176 A1* | 5/2018 | Orlick | G02B 27/0025 |
| 2019/0341003 A1* | 11/2019 | Inamura | G09G 3/342 |
| 2020/0099903 A1* | 3/2020 | Orlick | G03B 21/2053 |
| 2020/0410958 A1* | 12/2020 | Liang | G03B 21/2053 |

FOREIGN PATENT DOCUMENTS

| | | |
|---|---|---|
| JP | 2012-198439 A | 10/2012 |
| JP | 2015-155940 A | 8/2015 |

\* cited by examiner

PROCESSING METHOD OF IMAGE DATA, PROJECTION APPARATUS, PROCESSING APPARATUS OF IMAGE DATA

CROSS-REFERENCE TO RELATED APPLICATIONS

This application is based upon and claims the benefit of priority from prior Japanese patent application No. 2020-043891, filed on Mar. 13, 2020, the entire contents of which are incorporated herein by reference

TECHNICAL FIELD

The present invention relates to a processing method of image data, a projection apparatus, and a processing apparatus of image data.

BACKGROUND ART

In the related art, a projector is developed. Recently, the projector is also studied for a portable projector.

SUMMARY OF INVENTION

A processing method of image data performed by a processor of an information processing apparatus in accordance with an embodiment of the present invention, the processing method includes:

calculating a heat quantity value when projecting and displaying image data;

determining the image data as an image to be projected and displayed when the heat quantity value does not reach a threshold value; and generating processed image data so that a heat quantity is to be lower than the heat quantity value and determining the processed image data as an image to be projected and displayed when the heat quantity value exceeds the threshold value.

DESCRIPTION OF EMBODIMENTS

Figure 1:
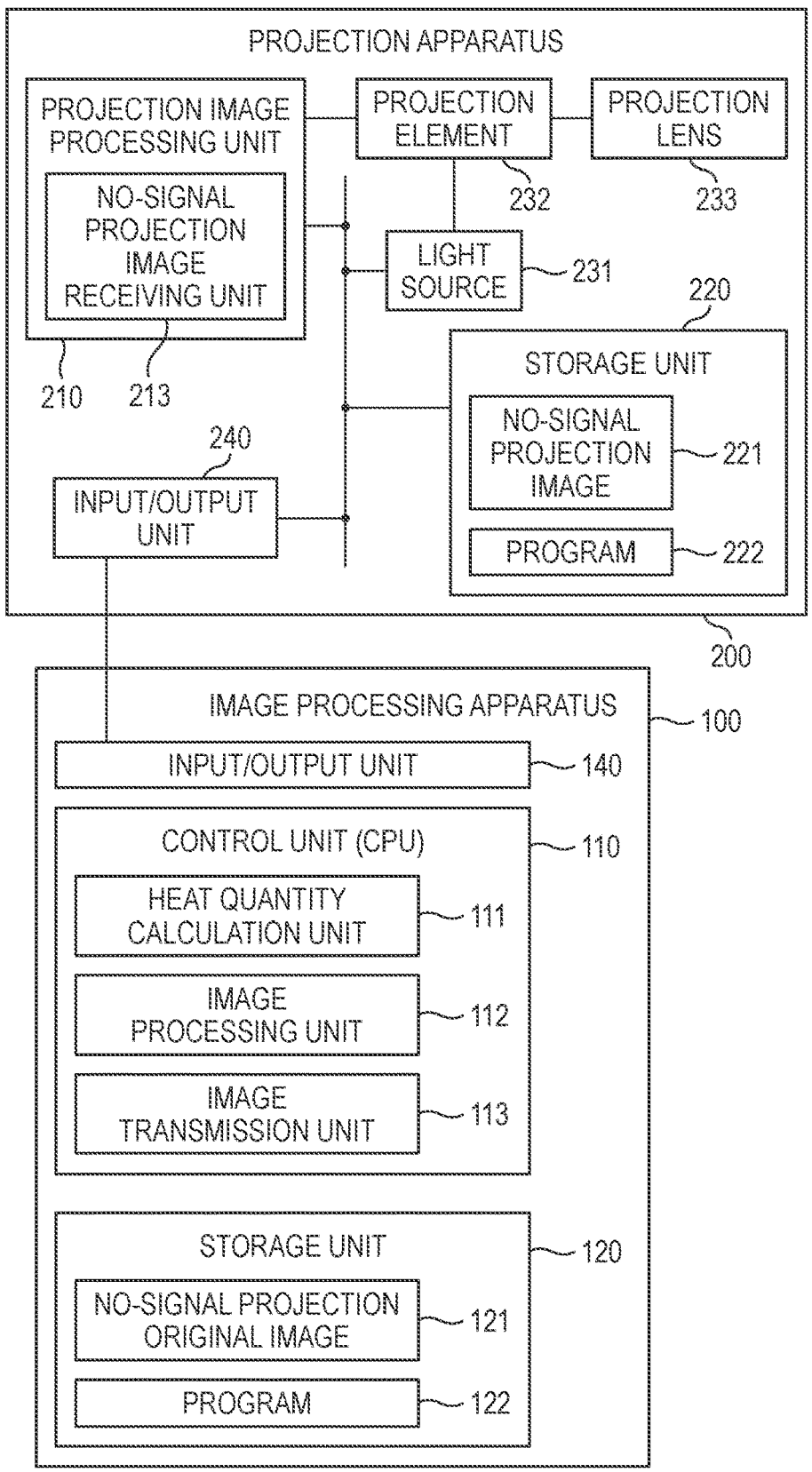
FIG. 1 is a functional block diagram of an image processing apparatus and a projection apparatus in accordance with the present embodiment.

First, a projection apparatus (projector) 200 (refer to FIGS. 1 to 3) in an embodiment of the present invention is described. The projection apparatus 200 is configured to store an image (no-signal projection image 221) that is projected when an image or a video picture to be projected is not input (when there is no signal). The no-signal projection image 221 may also be set by an owner (user) of the projection apparatus by transmitting an image to the projection apparatus, in addition to an image (default no-signal projection image) stored upon shipment of the projection apparatus.

Subsequently, an image processing apparatus 100 (refer to FIG. 1) is described. The image processing apparatus 100 is an apparatus separate from the projection apparatus 200, and is an apparatus such as a PC in which embedded application software is executed. The image processing apparatus 100 is configured to calculate a heat quantity that is generated when projecting the image (also simply referred to as "heat quantity of an image"), upon setting (when transmitting the no-signal projection image 221 to the projection apparatus 200). When a result of the calculation exceeds a threshold value that is a predetermined value, the image processing apparatus 100 changes the image so that the heat quantity to be generated is to be equal to or smaller than the threshold value, and transmits the changed image to the projection apparatus 200. When there is no signal, the projection apparatus 200 projects the changed image (no-signal projection image 221).

In the present embodiment, the projection apparatus 200 is described as being an apparatus separate from the image processing apparatus 100. However, in another embodiment, the configuration of the image processing apparatus 100 is included in the projection apparatus 200. That is, a processor provided on the projection apparatus 200-side processes image data to generate processed image data.

The heat quantity to be generated is calculated from a heat quantity that is generated from the projection apparatus 200 itself and a heat quantity that is generated when a projection light of the no-signal projection image 221 is changed to heat. The threshold value is determined so that even though heat is stored by the light source and the projection light for a predetermined time, a problem does not occur in a case such as a bag in which the projection apparatus 200 is put.

It is assumed that while the projection apparatus 200 is carried with being put in the bag, a power supply button is erroneously pushed due to being pushed by something. While being carried, there is no signal and the heat quantity is equal to or smaller than the threshold value even though an image is projected, so that a problem does not occur.

<<Configuration of Projection Apparatus>>

Figure 2:
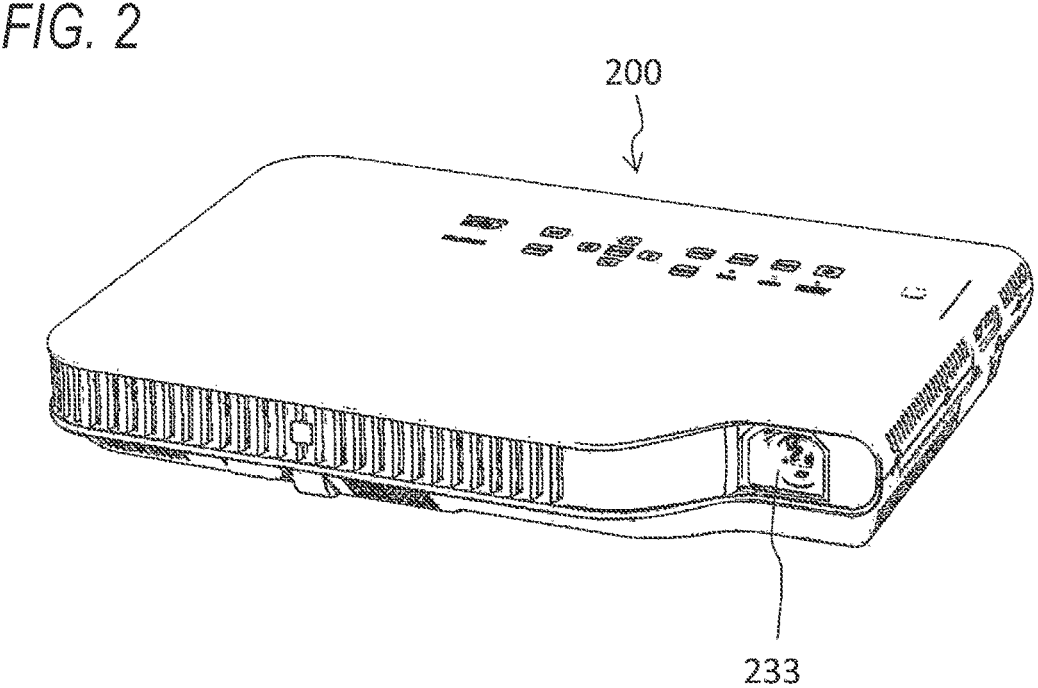
FIG. 2 depicts an outer shape of the projection apparatus in accordance with the present embodiment.
Figure 3:
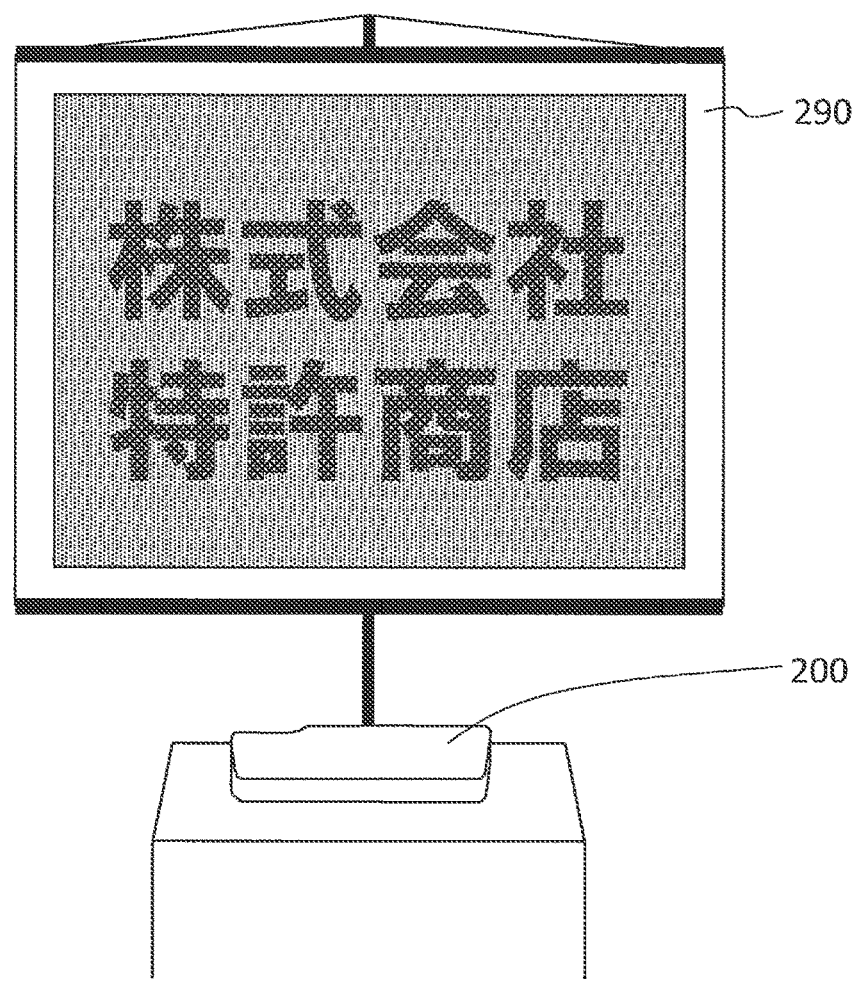
FIG. 3 depicts a state where the projection apparatus in accordance with the present embodiment projects a no-signal projection image on a screen.

FIG. 1 is a functional block diagram of the image processing apparatus 100 and the projection apparatus 200 in accordance with the present embodiment. FIG. 2 depicts an outer shape of the projection apparatus 200 in accordance with the present embodiment. FIG. 3 depicts a state where the projection apparatus 200 in accordance with the present embodiment projects the no-signal projection image 221 (refer to FIG. 1) on a screen 290.

The projection apparatus 200 is a DLP (Digital Light Processing) (registered trademark) projector. The projection apparatus 200 includes a projection image processing unit (scaler) 210, a storage unit 220, a light source 231, a projection element 232, a projection lens 233, and an input/output unit 240.

The input/output unit 240 is configured to output one signal, which is input from a VGA (Video Graphics Array) terminal, an HDMI (registered trademark) (High-Definition Multimedia Interface) terminal, an RCA terminal and the like, to the projection image processing unit 210, as a digital image. The input/output unit 240 also has a USB (Universal Serial Bus) terminal and a LAN (Local Area Network) terminal, and is configured to receive an original image of the no-signal projection image 221 that is projected when there is no input of a projection image (video picture) from the VGA terminal and the like (when there is no signal).

The light source 231 is light sources of red, blue and green lights configured by LD (Laser Diode), LED (Light Emitting Diode) and the like, for example. The light source 231 emits red, blue and green lights to the projection element 232.

The projection element 232 reflects the incident lights toward the projection lens 233, thereby forming a light image. The formed light image is projected to a to-be-projected body such as a screen by the projection lens 233. The projection element 232 is, for example, a micro mirror element. The micro mirror element has micro mirrors arranged in an array shape (for example, 1280×800). The micro mirrors are each controlled to be on and off at high speeds by the projection image processing unit 210 (which will be described later), thereby reflecting the lights incident from the light source 231 toward the projection lens 233 or causing the lights to deviate from the projection lens 233 to form a light image.

The projection image processing unit 210 (scaler) configures a main CPU (Central Processing Unit) of the projection apparatus 200, and controls the projection element 232. The projection image processing unit 210 also includes a no-signal projection image receiving unit 213. The no-signal projection image receiving unit 213 is configured to authenticate the image processing apparatus 100, and to store an image transmitted by the image processing apparatus 100, as the no-signal projection image 221.

The storage unit 220 is configured by, for example, an EEPROM (Electrically Erasable Programmable Read Only Memory), a flash memory and the like. In the storage unit 220, a program 222 for controlling the projection apparatus 200, a setting value, the no-signal projection image 221 and the like are stored. The program 222 includes processing procedures of the no-signal projection image receiving unit 213 receiving an image transmitted by the image processing apparatus 100 and storing the same as the no-signal projection image 221, for example.

<<Configuration of Image Processing Apparatus>>

The image processing apparatus 100 is, for example, a PC, and the program 122 (which will be described later) is activated to cause the PC to function as the image processing apparatus 100. The image processing apparatus 100 and the projection apparatus 200 are connected to each other by a USB cable, a LAN and the like. The apparatuses may also be connected by other communication methods.

The image processing apparatus 100 includes a control unit 110, a storage unit 120, and an input/output unit 140. The input/output unit 140 includes a USB terminal or a LAN interface, and is configured to transmit the no-signal projection image 221 to the projection apparatus 200. The input/output unit 140 further includes a GUI (Graphical User Interface) device such as a display, a keyboard, a mouse and the like.

The storage unit 120 is configured by a ROM, a RAM (Random Access Memory), a flash memory and the like, and stores a no-signal projection original image 121 and the program 122. The no-signal projection original image 121 is an original image of the no-signal projection image 221.

The control unit 110 is configured by a CPU, and the CPU is configured to execute the program 122, thereby performing no-signal projection image setting processing shown in FIG. 5 (which will be described later). The control unit 110 includes a heat quantity calculation unit 111, an image processing unit 112, and an image transmission unit 113.

The heat quantity calculation unit 111 (prediction means) is configured to calculate a heat quantity W, which is generated when the no-signal projection original image 121 that is an original image of the no-signal projection image 221 is projected, by using an equation (1). That is, the heat quantity calculation unit 111 (prediction means) predicts in advance a degree of influence of an image on a heat quantity that is generated as the image is projected and displayed in a case where the image is registered and designated in the storage unit 220 (storage means) as an image that is projected and displayed at the time when the projection apparatus 200 is in a predetermined state. Note that, the predetermined state is a state where no image signal is input to the projection apparatus 200 from an outside.

$$W = S + \Sigma(WR \times CR(PR) + WG \times CG(PG) + WB \times CB(PB)) \qquad (1)$$

S is a heat quantity generated by the light source. $\Sigma$ indicates a sum of pixels P configuring an image. PR is brightness of a red component of the pixel P. CR is a gamma function (refer to FIG. 4) of the red component that is used for brightness correction upon projection. WR is a constant indicative of a heat quantity of a projection image. WR×CR (PR) indicates a heat quantity of an image formed by projecting pixels P relating to the red component. WG×CG (PG) and WB×CB (PB) are also similar and indicate a heat quantity of an image formed by projecting pixels P relating to a green component and a heat quantity of an image formed by projecting pixels P relating to a blue component, respectively.

That is, the processor 110 calculates a heat quantity value, based on a brightness value of each pixel of image data.

Like this, the heat quantity is an integrated value of brightness. The heat quantity is also a heat quantity on a predetermined unintended projection plane. The predetermined unintended projection plane is positioned within a closed space in which the projection apparatus is placed, or a space surrounded by a surface on which the projection apparatus is placed and peripheral side surfaces. The plane is also a special environment in which a distance from the projection lens 233 to the projection place is equal to or smaller than a predetermined threshold value, so-called a distance between the projection lens 233 and the projection plane is close.

Figure 4:
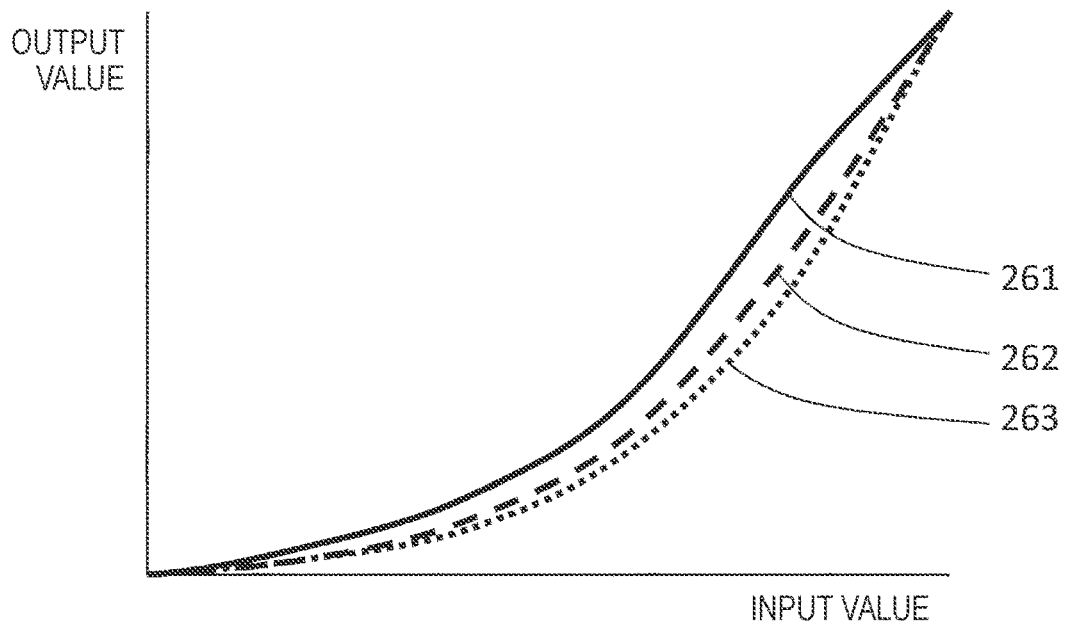
FIG. 4 is graphs (gamma curves) of gamma functions that are used for brightness correction upon projection in accordance with the present embodiment.

FIG. 4 is graphs (gamma curves) of gamma functions that are used for brightness correction upon projection in accordance with the present embodiment. A horizontal axis indicates brightness (input value) before correction, and a vertical axis indicates brightness (output value) after correction. Curves 261, 262 and 263 each indicate gamma functions of red, green and blue. In a case where the projection apparatus 200 has a plurality of projection modes, there is a gamma curve for each of the projection modes. CR included in the equation (1) is a gamma function (gamma curve) of red components having the largest value among the plurality of projection modes. This also applies to CG and CB. Note that, the gamma function upon calculation of the heat quantity by using the equation (1) may also be configured by a look-up table or other manners.

Back to FIG. 1, when the heat quantity calculated by the heat quantity calculation unit 111 exceeds a threshold value, the image processing unit 112 processes the no-signal projection original image 121 so that the heat quantity is to be equal to or smaller than the threshold value, and stores the processed image as a transmission image. When the heat quantity is equal to or smaller than the threshold value, the image processing unit 112 stores the no-signal projection original image 121 as a transmission image without processing the original image.

The image transmission unit 113 is configured to execute authentication processing for the projection apparatus 200, and to transmit the transmission image as a no-signal projection image. The authentication processing may be executed using a password or a special transmission protocol, in addition to a method of using encryption technology.

That is, in a processing method of image data in accordance with an embodiment of the present invention, the processor 110 of the information processing apparatus:

calculates a heat quantity value when projecting and displaying image data (S12), determines the image data as an image to be projected and displayed when the heat quantity value does not reach a threshold value (15), and when the heat quantity value exceeds the threshold value, generates processed image data so that a heat quantity is to be lower than the heat quantity value (S14) and determines the processed image data as an image to be projected and displayed (S15).

<<No-Signal Projection Image Setting Processing>>

Figure 5:
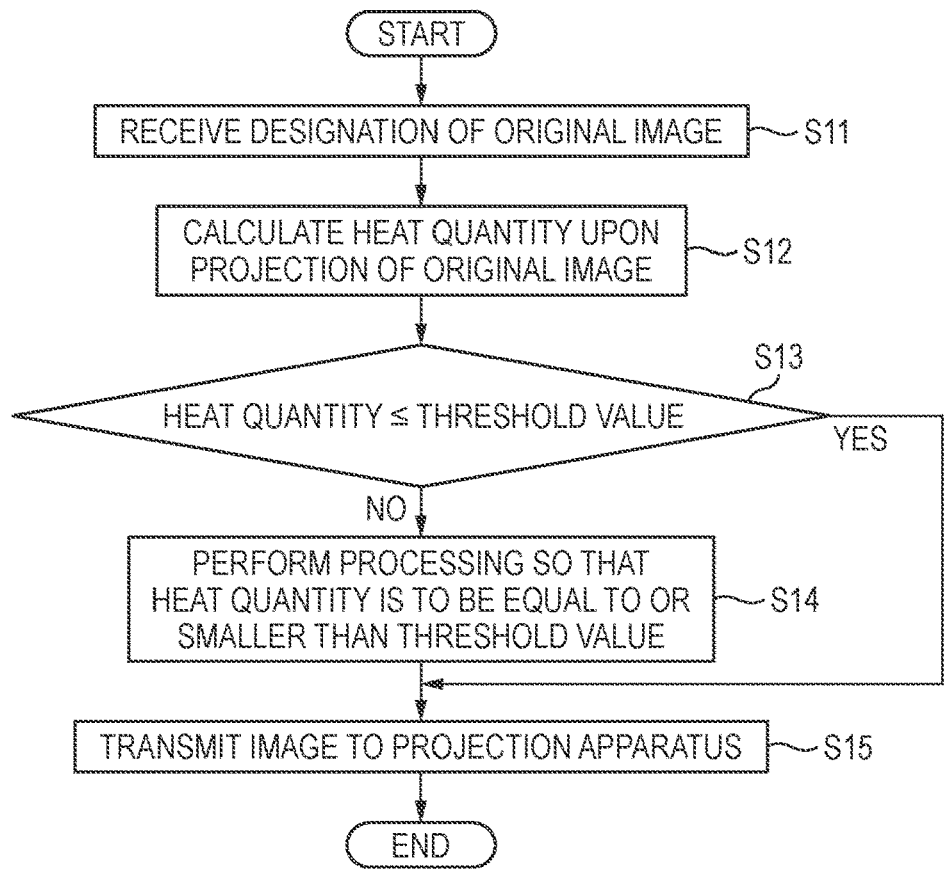
FIG. 5 is a flowchart of no-signal projection image setting processing in accordance with the present embodiment.
Figure 6:
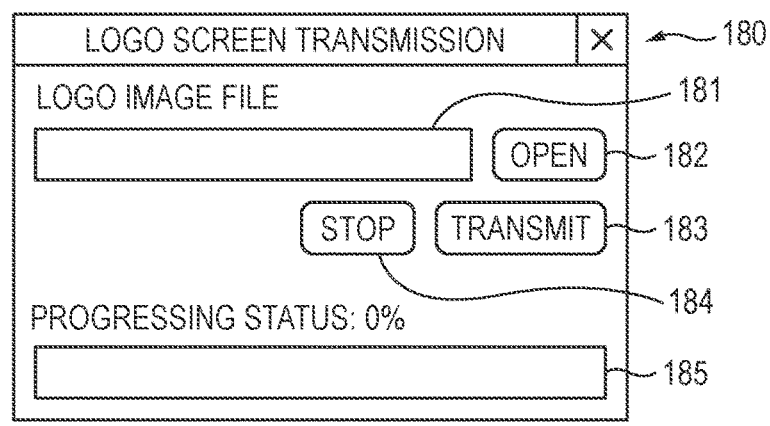
FIG. 6 depicts a configuration of a screen of the image processing apparatus in accordance with the present embodiment.

FIG. 5 is a flowchart of no-signal projection image setting processing in accordance with the present embodiment. FIG. 6 depicts a configuration of a screen 180 of the image processing apparatus 100 in accordance with the present embodiment. The no-signal projection image setting processing is described with reference to FIGS. 5 and 6.

In step S11, the control unit 110 displays the screen 180 and receives a designation of the no-signal projection original image 121 (hereinbelow, also simply referred to as "original image") that is an original image of the no-signal projection image. When an "open" button 182 on the screen 180 is clicked, a file dialogue screen (not shown) on which an original image (a file including the original image) is designated is displayed. When the original image is designated, a file name thereof (a file path name) is displayed on a text box 181. Subsequently, when a "transmission" button 183 is clicked, the control unit 110 proceeds to step S12.

In step S12, the heat quantity calculation unit 111 (prediction means) calculates a heat quantity that is generated when the projection apparatus 200 projects the original image by using the equation (1). That is, the heat quantity calculation unit 111 (prediction means) predicts in advance a degree of influence of an image on a heat quantity that is generated as an image is projected and displayed, in a case where an image in the predetermined storage means (storage unit 220), which is projected and displayed by the projection apparatus 200, is registered and designated as an image that is projected and displayed at the time when the projection apparatus 200 is in a predetermined state (a state where no image signal is input to projection apparatus 200 from an outside).

In step S13, when the heat quantity calculated in step S12 is equal to or smaller than the threshold value (step S13→YES), the image processing unit 112 proceeds to step S15, and when the heat quantity exceeds the threshold value (step S13→NO), the image processing unit 112 proceeds to step S14.

In step S14, the image processing unit 112 (processing means) processes the original image so that the heat quantity is to be equal to or smaller than the threshold value. The processing method is described with reference to FIGS. 7 to 12. That is, when it is determined that the degree of influence predicted in advance by the heat quantity calculation unit 111 (prediction means) is greater than a predetermined threshold value, the image processing unit 112 (processing means) processes the image so as to reduce the degree of influence, thereby generating a processed image.

When an image is registered and designated as an image that is projected and displayed at the time when no image signal is input to the projection apparatus 200 from an outside, the original image is processed so that the heat quantity is to be equal to or smaller than the threshold value. However, as the threshold value, a heat quantity of the original image (a heat quantity that is generated as an image is projected and displayed) may also be used. By using a heat quantity of the original image as the threshold value, it is sufficient if the heat quantity of the registered and designated image is reduced even small, and it can be easily implemented even though the effect is small.

In step S15, the image transmission unit 113 performs authentication processing on the projection apparatus 200. Then, the image transmission unit 113 transmits the image processed in step S14 (in the case of step S13→NO) or the original image (in the case of step S13→YES) to the projection apparatus 200. The projection image processing unit 210 of the projection apparatus 200 stores the received image in the storage unit 220, as the no-signal projection image 221. That is, the registration means of the image processing apparatus 100 registers the processed image generated by the image processing unit 112 (processing means) in the predetermined storage means (storage unit 220), as an image that is projected and displayed by the projection apparatus 200.

Note that, during the processing of steps S12 to S15, the control unit 110 displays a progress bar 185 on the screen 180 (refer to FIG. 6) according to the progressing of the processing. Also, when a "stop" button 184 is clicked, the control unit 110 stops the processing.

<<Examples of Image Processing>>

Figure 7:
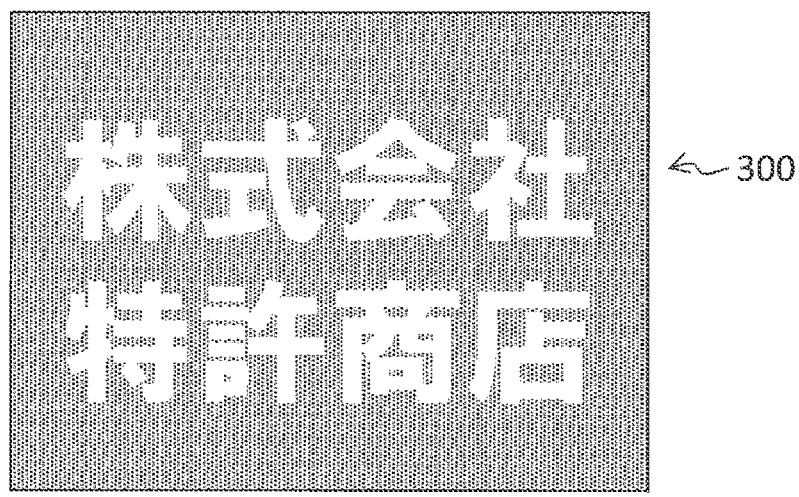
FIG. 7 exemplifies an original image of a no-signal projection image in accordance with the present embodiment.

In the below, examples of the method where the image processing unit 112 processes the original image in step S14 are described. FIG. 7 exemplifies an original image 300 of the no-signal projection image in accordance with the present embodiment. The original image 300 is an image where an owner's company name is written in white letters on a plain background with the same color and no pattern.

Figure 8:
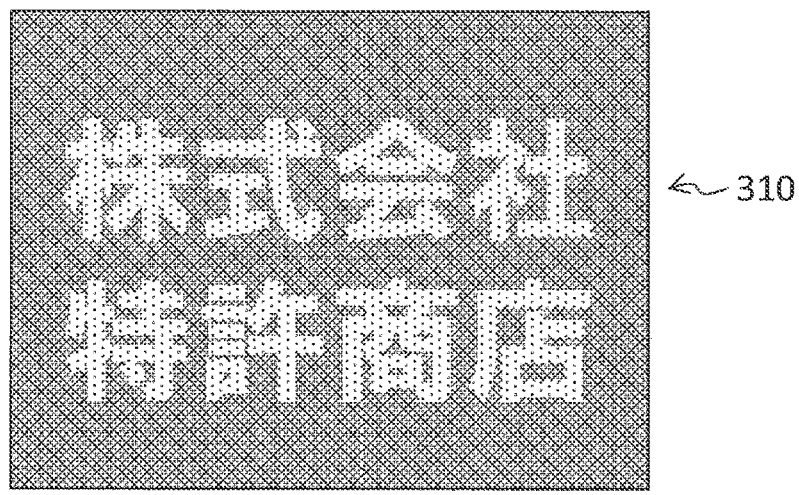
FIG. 8 exemplifies a processed image (1) in accordance with the present embodiment.

FIG. 8 exemplifies a processed image 310 (1) in accordance with the present embodiment. This processing method is a method of reducing brightness of each pixel of the original image 300. The image processing unit 112 may reduce the brightness in a predetermined ratio, or may reduce the brightness in a greater ratio for the pixel of higher brightness.

That is, the processor 110 generates processed image data in which brightness of certain pixels in the image data is reduced.

Figure 9:
FIG. 9 exemplifies a processed image (2) in accordance with the present embodiment.

FIG. 9 exemplifies a processed image 320 (2) in accordance with the present embodiment. This processing method is a method of reducing brightness of pixels having the largest number of pixels among pixels of the same color. Since the background is the same color and the number of pixels (area) thereof is largest in the original image 300, the image processing unit 112 reduces brightness of the background.

That is, the processor 110 generates processed image data in which brightness of a color, which is most used, of colors included in the image data is reduced.

Figure 10:
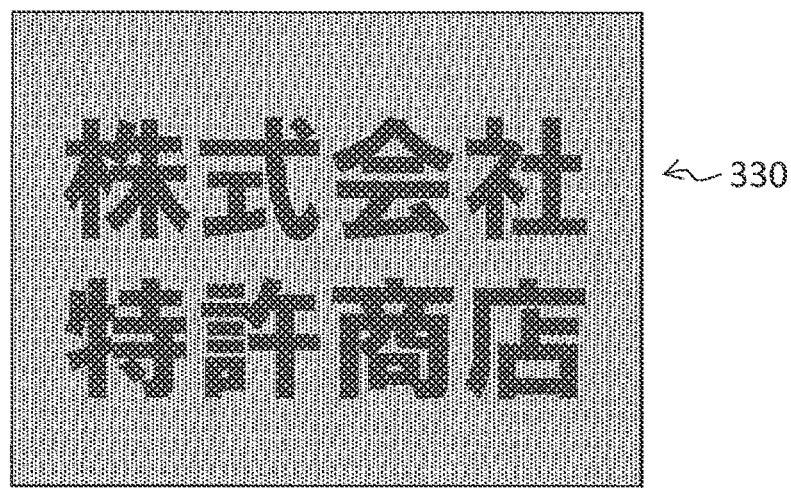
FIG. 10 exemplifies a processed image (3) in accordance with the present embodiment.

FIG. 10 exemplifies a processed image 330 (3) in accordance with the present embodiment. This processing method is a method of reducing brightness of pixels, which have brightness values larger than a predetermined brightness value, among pixels configuring the original image 300. In the original image 300, the brightness of pixels configuring the company name in white letters is high, so that the image processing unit 112 reduces the brightness of pixels of the company name.

That is, when the brightness values of certain pixels in the image data reach the predetermined brightness value, the processor 110 generates processed image data.

Figure 11:
FIG. 11 exemplifies a processed image (4) in accordance with the present embodiment.

FIG. 11 exemplifies a processed image 340 (4) in accordance with the present embodiment. This processing method is a method of reducing the original image 300 and reducing brightness of some or all of an area except the reduced image. The image processing unit 112 reduces the original image 300 by ½, arranges the same at the center and reduces brightness of a periphery to zero (black).

That is, the processor 110 generates processed image data in which reduced image data of the image data is arranged in a certain area and brightness of some or all of pixels included in an area except the certain area is reduced.

Figure 12:
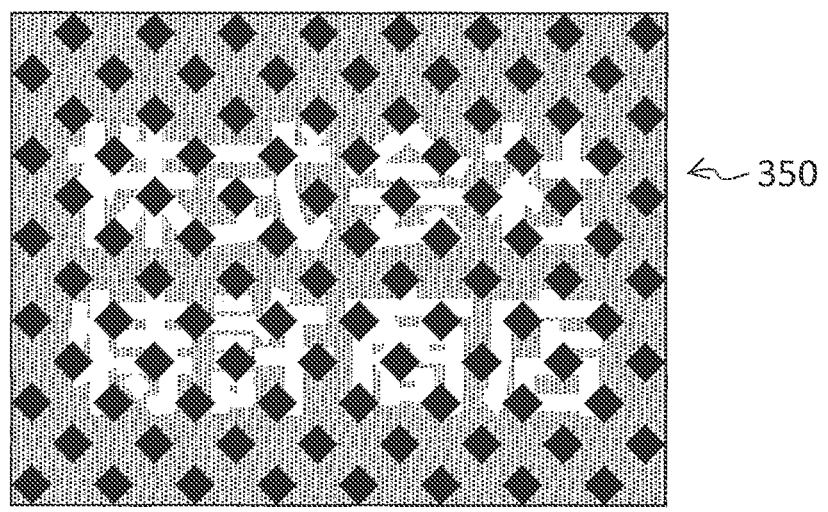
FIG. 12 exemplifies a processed image (5) in accordance with the present embodiment.

FIG. 12 exemplifies a processed image 350 (5) in accordance with the present embodiment. This processing method is a method of reducing brightness in an area of a predetermined pattern of the original image 300. The image processing unit 112 reduces brightness of a rhombus pattern to zero (black).

That is, the processor 110 generates processed image data in which a brightness value of a set area in the image data is reduced.

<<Features of No-Signal Projection Image Setting Processing>>

The image processing apparatus 100 calculates a heat quantity that is generated when projecting the original image 300 (no-signal projection original image 121), upon setting of the no-signal projection image. When the heat quantity exceeds the threshold value, the original image 300 is processed so that the heat quantity is to be equal to or smaller than the threshold value and is then transmitted to the projection apparatus 200, and the projection apparatus 200 receives the processed original image 300 and stores the same as the no-signal projection image 221. By doing so, even though a power supply button is erroneously pushed due to being pushed by something while the projection apparatus 200 is put in a bag and the no-signal projection image 221 is thus projected, the heat quantity to be generated becomes equal to or smaller than the threshold value, so that the heat quantity to be generated can be suppressed.

That is, when the power supply button of the projection apparatus 200 is pushed and the projection apparatus 200 does not receive an input signal from an outside, the processor 110 determines the image data and the processed image data so that the projection apparatus 200 projects and displays an image.

Modified Embodiments

In the above embodiment, the projection apparatus 200 authenticates the image processing apparatus 100 and receives the no-signal projection image 221 with the heat quantity equal to or smaller than the threshold value. By the authentication, it is possible to guarantee that the heat quantity upon projection of the no-signal projection image 221 is to be equal to or smaller than the threshold value. Instead of the authentication, the projection apparatus 200 may calculate a heat quantity upon projection of a received image, and may not receive an image when the heat quantity exceeds the threshold value.

Note that, the projection apparatus 200 is a projection apparatus that can operate by using, as the original power supply, a battery power supply as a DC power supply or a power supply (commercial power supply as an AC power supply) except the battery power supply. The projection apparatus 200 detects whether a battery is driven by a power supply type detection unit (detection means). The power supply type detection unit can determine whether a battery is driven by a voltage value input from a power supply, for example. Alternatively, when a battery is driven, a pulse signal is output from the battery, unlike drive by the AC power supply, so that it is possible to determine whether a battery is driven. An acquisition means acquires a result detected by the power supply type detection unit, which indicates whether a battery is driven.

In a case where the projection apparatus 200 is carried with being put in a case such as a bag, the projection apparatus 200 is considered to operate by a battery power supply as a DC power supply, as the original power supply, and it is difficult to consider that the projection apparatus 200 operates by a power supply (commercial power supply as an AC power supply) except the battery power supply. Therefore, only when the power supply type detection unit provided to the projection apparatus 200 detects that the projection apparatus 200 is driven by a battery power supply as the original power supply, the image processing apparatus 100 may calculate a heat quantity of an image that is projected when there is no signal, and execute control of processing the image so that the heat quantity is to be equal to or smaller than the threshold value when the calculated heat quantity is larger than the threshold value.

That is, when it is detected that the projection apparatus 200 is connected to a battery power supply as a DC power supply, as a power supply for lighting of the light source 231, the processor 110 determines the image data and the processed image data so that the projection apparatus 200 projects and displays the same.

Note that, the processed image data may also be generated by any combination of the above-described methods.

Although some embodiments and modified embodiments of the present invention have been described, the embodiments are just exemplary and do not limit the technical scope of the present invention. For example, when the heat quantity that is generated from the light source 231 is small as negligible as, the heat quantity may be calculated with S in the equation (1) being set to zero (0). The present invention can adopt a variety of other embodiments, and a variety of omissions and replacements can be made without departing from the gist of the present invention. The embodiments and modifications thereof are included in the scope and gist of the invention described in the specification and the like, and are also included in the invention defined in the claims and the equivalent scope thereof

What is claimed is:

1. A processing method of image data performed by a processor of an information processing apparatus, the processing method comprising:

calculating a heat quantity value when projecting and displaying image data;

determining the image data as an image to be projected and displayed when the heat quantity value does not reach a threshold value; and when the heat quantity value exceeds the threshold value, generating processed image data so that a heat quantity is to be lower than the heat quantity value and determining the processed image data as an image to be projected and displayed.

2. The processing method of image data according to claim 1, wherein the processing method comprises determining the image data and the processed image data so that the projection apparatus projects and displays that same when a power supply button of a projection apparatus is pushed and the projection apparatus does not receive an input signal from an outside.

3. The processing method of image data according to claim 2, wherein the processing method comprises determining the image data and the processed image data so that the projection apparatus projects and displays the same when it is detected that the projection apparatus is connected to a battery power supply as a DC power supply, as a power supply for lighting of a light source.

4. The processing method of image data according to claim 1, wherein the processing method comprises calculating the heat quantity value, based on a brightness value of each pixel of the image data.

5. The processing method of image data according to claim 1, wherein the processing method comprises generating the processed image data in which brightness of certain pixels in the image data is reduced.

6. The processing method of image data according to claim 5, wherein the processing method comprises generating the processed image data when brightness values of the certain pixels in the image data reach a predetermined brightness value.

7. The processing method of image data according to claim 1, wherein the processing method comprises generating the processed image data in which brightness of a color, which is most used, of colors included in the image data is reduced.

8. The processing method of image data according to claim 1, wherein the processing method comprises generating the processed image data in which reduced image data of the image data is arranged in a certain area and brightness of some or all of pixels included in an area except the certain area is reduced.

9. The processing method of image data according to claim 1, wherein the processing method comprises generating the processed image data in which a brightness value of a set area in the image data is reduced.

10. A projection apparatus comprising:
a light source; and
a processor,
wherein the processor is configured to:
calculate a heat quantity value when projecting and displaying image data;
determine the image data as an image to be projected and displayed when the heat quantity value does not reach a threshold value; and
when the heat quantity value exceeds the threshold value, generate processed image data so that a heat quantity is to be lower than the heat quantity value and determine the processed image data as an image to be projected and displayed.

11. The projection apparatus according to claim 10, wherein the processor is configured to determine the image data and the processed image data so as to project and display the same when a power supply button is pushed and an input signal is not received from an outside.

12. The projection apparatus according to claim 11, wherein the processor is configured to determine the image data and the processed image data so as to project and display the same when it is detected that a battery power supply as a DC power supply is connected as a power supply for lighting of the light source.

13. The projection apparatus according to claim 10, wherein the processor is configured to calculate the heat quantity value, based on a brightness value of each pixel of the image data.

14. The projection apparatus according to claim 10, wherein the processor is configured to generate the processed image data in which brightness of certain pixels in the image data is reduced.

15. The projection apparatus according to claim 14, wherein the processor is configured to generate the processed image data when brightness values of the certain pixels in the image data reach a predetermined brightness value.

16. The projection apparatus according to claim 10, wherein the processor is configured to generate the processed image data in which brightness of a color, which is most used, of colors included in the image data is reduced.

17. The projection apparatus according to claim 10, wherein the processor is configured to generate the processed image data in which reduced image data of the image data is arranged in a certain area and brightness of some or all of pixels included in an area except the certain area is reduced.

18. The projection apparatus according to claim 10, wherein the processor is configured to generate the processed image data in which a brightness value of a set area in the image data is reduced.

19. A processing apparatus of image data comprising:
a memory; and
a processor,
wherein the processor is configured to:
calculate a heat quantity value when projecting and displaying image data;
store the image data in the memory as an image to be projected and displayed, when the heat quantity value does not reach a threshold value; and
when the heat quantity value exceeds the threshold value, generate processed image data so that a heat quantity is to be lower than the heat quantity value and store the processed image data in the memory as an image to be projected and displayed.

* * * * *